(12) United States Patent
Maier

(10) Patent No.: US 9,188,156 B2
(45) Date of Patent: Nov. 17, 2015

(54) AUXILIARY BEARING CENTERING DEVICE

(71) Applicant: Dresser-Rand Company, Olean, NY (US)

(72) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 14/260,446

(22) Filed: Apr. 24, 2014

(65) Prior Publication Data

US 2014/0321785 A1   Oct. 30, 2014

Related U.S. Application Data

(60) Provisional application No. 61/817,397, filed on Apr. 30, 2013.

(51) Int. Cl.
| | |
|---|---|
| *F16C 19/04* | (2006.01) |
| *F16C 23/08* | (2006.01) |
| *F16C 35/077* | (2006.01) |
| *F16C 39/02* | (2006.01) |
| *F16C 32/04* | (2006.01) |
| *F16C 19/18* | (2006.01) |

(52) U.S. Cl.
CPC ............ *F16C 23/084* (2013.01); *F16C 32/0442* (2013.01); *F16C 35/077* (2013.01); *F16C 39/02* (2013.01); *F16C 19/183* (2013.01); *F16C 2360/24* (2013.01)

(58) Field of Classification Search
CPC ........ F16C 13/06; F16C 23/04; F16C 23/043; F16C 33/58; F16C 23/084; F16C 32/0442; F16C 39/02; F16C 2360/24
USPC .......... 384/102, 126–128, 206, 456, 490, 548, 384/624, 627
See application file for complete search history.

(56) References Cited

U.S. PATENT DOCUMENTS

| | | | | |
|---|---|---|---|---|
| 6,524,005 | B2 * | 2/2003 | Bridges | 384/102 |
| 8,283,825 | B2 * | 10/2012 | Maier | 384/624 |
| 2004/0189124 | A1 * | 9/2004 | Baudelocque et al. | 384/624 |

* cited by examiner

*Primary Examiner* — James Pilkington
(74) *Attorney, Agent, or Firm* — Edmonds & Nolte, PC

(57) ABSTRACT

An auxiliary bearing system may include an auxiliary bearing receiver housing and an inertia ring. The auxiliary bearing receiver housing may include an axial inner surface, a first radially extending surface, and a first arcuate surface extending therebetween. The inertia ring may include an axial outer surface, a second radially extending surface, and a second arcuate surface extending therebetween. The second arcuate surface may have a radial outer end adjacent the second radially extending surface and a radial inner end adjacent the axial outer surface. The inertia ring may define a first angle between the axis of rotation of the shaft and a first tangent at a first point on the second arcuate surface adjacent the radial outer end, and a second angle between the axis of rotation of the shaft and a second tangent at a second point on the second arcuate surface adjacent the radial inner end.

24 Claims, 5 Drawing Sheets

AUXILIARY BEARING CENTERING DEVICE

CROSS-REFERENCE TO RELATED APPLICATIONS

This application claims priority to U.S. Provisional Patent Application having Ser. No. 61/817,397, which was filed Apr. 30, 2013. This priority application is hereby incorporated by reference in its entirety into the present application to the extent consistent with the present application.

BACKGROUND

Active magnetic bearings (AMBs) have recently emerged as an attractive technology for controlling the position of a wide range of rotating machinery shafts, particularly turbomachine rotors.

Turbomachines such as compact compressors combine a pressurized, high-speed motor and magnetic bearing system with the compressor in a single, hermetically sealed motor-compressor module. FIG. 1 illustrates a cross-sectional view of a conventional compact compressor 100. The conventional compact compressor 100 has a compressor end 102 and motor end 104. A pressure casing 106 hermetically seals the compressor and the motor. As illustrated in FIG. 1, a primary bearing system including, for example, active magnetic bearings (AMBs) 108 may be employed at various locations along the shaft of the conventional compact compressor 100. AMBs may typically be located at the ends of the shaft and, depending upon the length of the shaft, at one or more locations between the ends of the shaft. In addition to the primary bearing system, current designs may require an auxiliary bearing system to allow the rotor system to run non-destructively for some period if a failure of the primary bearing system occurs.

FIG. 2 illustrates a cross-sectional view of a portion of a rotating machine utilizing a conventional auxiliary bearing system. FIG. 2 also illustrates a primary bearing system used in conjunction with the conventional auxiliary bearing system. In FIG. 2, a shaft 202 of the rotating machine is supported by the primary bearing system including at least a pair of radial active magnetic bearings 204 (only one shown) and a thrust active magnetic bearing 206 during normal operation of the rotating machine. When the primary bearing system fails, the shaft 202 is supported by the conventional auxiliary bearing system including at least a pair of auxiliary bearings 208.

During operation, auxiliary bearings control the radial position and the axial position of the rotor system (for example, the shaft and/or other rotating components) while static and dynamic radial and thrust forces act on the rotor system. The auxiliary bearings are typically inactive while the rotor system of the rotating machine is supported by the primary bearing system during normal operating conditions. This is achieved by providing some clearance (both axial and radial) between the interfacing surfaces of the auxiliary bearings and the rotor system. When the primary bearing system fails, the shaft de-levitates and the rotor "drops" radially (for a horizontal axis rotor system) onto the auxiliary bearing system. Appropriate portions of the auxiliary bearing system accelerate to rotor rotational speed and take over the bearing function from the failed primary bearing system. A significant problem of such a system is controlling the shaft position when the rotor "drops" on the auxiliary bearing system. Some conventional auxiliary bearing systems can become unstable during the transient event, resulting in damage to the rotating machine.

There is a need, therefore, for an auxiliary bearing system that stably supports the rotating shaft when the primary bearing system fails and further minimizes damage to the rotating machine.

SUMMARY

Example embodiments of the disclosure may provide an auxiliary bearing system to support a rotating shaft. The auxiliary bearing system may include an auxiliary bearing receiver housing and an inertia ring. The auxiliary bearing receiver housing may include an axial inner surface parallel to a first radially extending surface and a first arcuate surface extending between the axial inner surface and the first radially extending surface. The inertia ring may be coupled to the rotating shaft and may include an axial outer surface, a second radially extending surface parallel to the axial outer surface, and a second arcuate surface extending between the axial outer surface and the second radially extending surface. The second arcuate surface may have a radial outer end at or adjacent the second radially extending surface and a radial inner end at or adjacent the axial outer surface. The inertia ring may define a first angle between the axis of rotation of the rotating shaft and a first tangent at a first point on the second arcuate surface at or adjacent the radial outer end, and a second angle between the axis of rotation of the rotating shaft and a second tangent at a second point on the second arcuate surface at or adjacent the radial inner end. The first angle may be greater than the second angle and the second arcuate surface may be configured such that the inertia ring seats the auxiliary bearing receiver housing when the inertia ring contacts the auxiliary bearing receiver housing.

Example embodiments of the disclosure may provide a rotor system that may include a shaft, a primary bearing system that supports the shaft during normal operating conditions, and an auxiliary bearing system that supports the shaft when the primary bearing system fails. The auxiliary bearing system may include an auxiliary bearing receiver housing and an inertia ring coupled to the shaft. The auxiliary bearing receiver housing may include a first arcuate surface extending between a first radially extending surface of the auxiliary bearing receiver housing and an axial inner surface of the auxiliary bearing receiver housing. The inertia ring may contact the auxiliary bearing receiver housing when the primary bearing system fails. The inertia ring may include an axial outer surface, a second radially extending surface parallel to the axial outer surface, and a second arcuate surface extending between the axial outer surface and the second radially extending surface. The second arcuate surface may be configured such that an angle between the rotational axis of the shaft and a tangent at a first point on the second arcuate surface at or adjacent the second radially extending surface may be greater than an angle between the rotational axis of the shaft and a tangent at a second point on the second arcuate surface at or adjacent the axial outer surface.

Example embodiments of the disclosure may provide a method for supporting a shaft. The method may include providing an inertia ring coupled to the shaft and extending an auxiliary bearing receiver housing circumferentially around the inertia ring such that a radial clearance and an axial clearance are defined between the inertia ring and the auxiliary bearing receiver housing. The inertia ring may have an arcuate surface extending circumferentially thereon. A geometry of the arcuate surface may be such that an angle between the rotational axis of the shaft and a tangent at a first point on the arcuate surface may be greater than an angle between the rotational axis of the shaft and a tangent at a second point on the arcuate surface. The first point may be at or adjacent a radial outer end of the arcuate surface and the second point may be at or adjacent a radial inner end of the arcuate surface.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
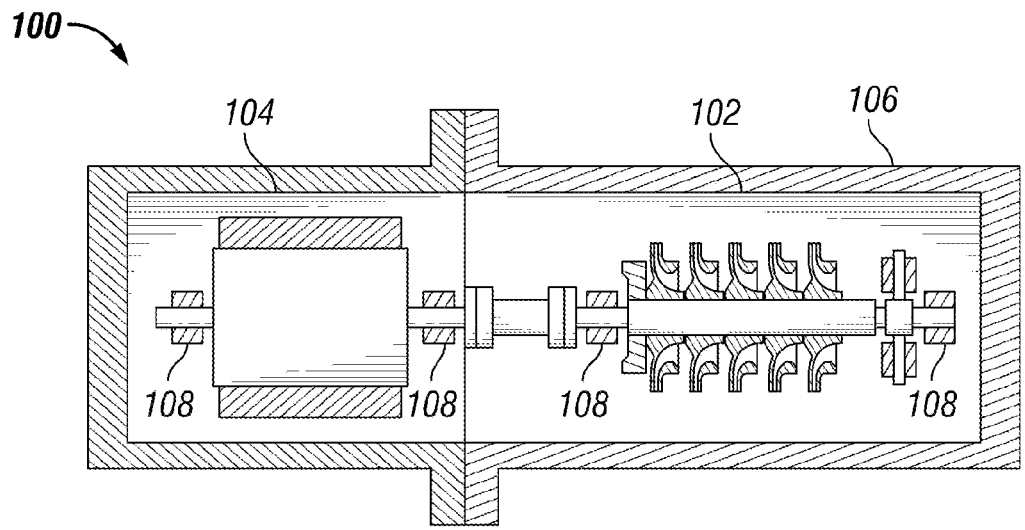
FIG. 1 illustrates a cross-sectional view of a conventional compact compressor.
Figure 2:
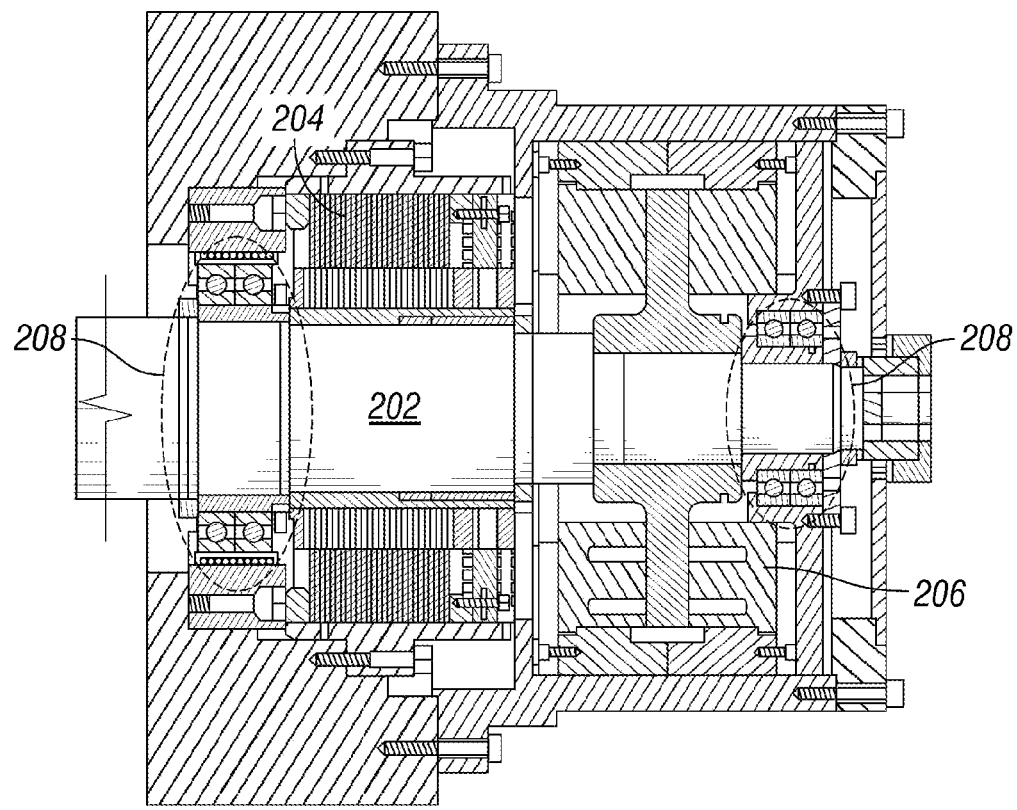
FIG. 2 illustrates a cross-sectional view of a portion of a rotating machine utilizing a conventional auxiliary bearing system.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 3:
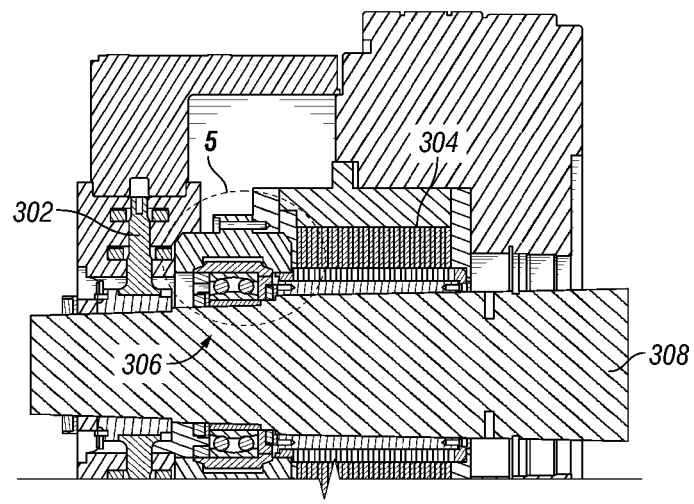
FIG. 3 illustrates a cross-sectional view of a portion of a rotating machine utilizing an auxiliary bearing system, according to one or more exemplary embodiments disclosed.

FIG. 3 illustrates a cross-sectional view of a portion of a rotating machine, for example, a turbomachine, utilizing an auxiliary bearing system 306, according to one or more exemplary embodiments disclosed. FIG. 3 also illustrates a primary bearing system utilized in conjunction with the auxiliary bearing system 306. The primary bearing system may include a thrust active magnetic bearing 302 and at least two radial active magnetic bearings 304 (only one shown). The primary bearing system may support the shaft 308 during normal operation of the rotating machine. The rotating machine may include at least two auxiliary bearing systems 306 (only one shown) at various axially spaced locations along a shaft 308 of the rotating machine.

Figure 4:
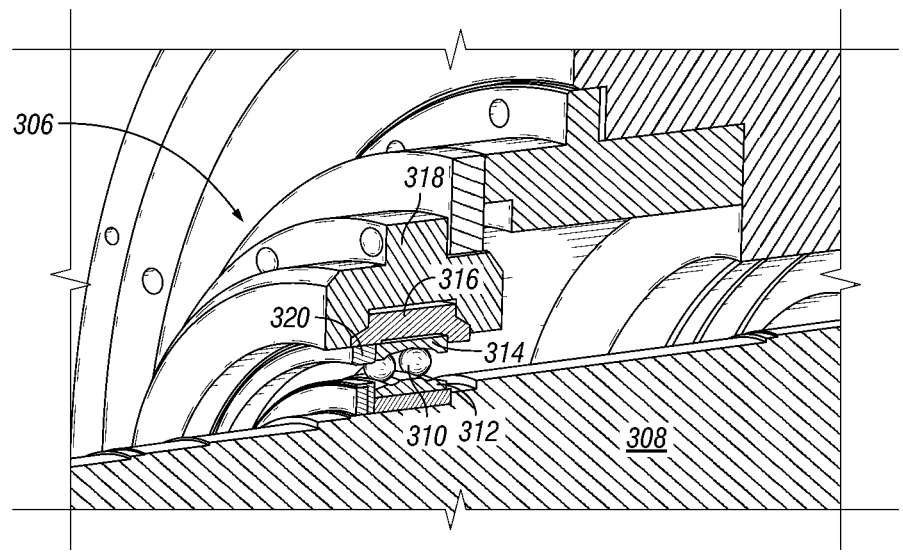
FIG. 4 illustrates a cross-sectional perspective view of a portion of the auxiliary bearing system illustrated in FIG. 3, according to one or more exemplary embodiments disclosed.
Figure 5:
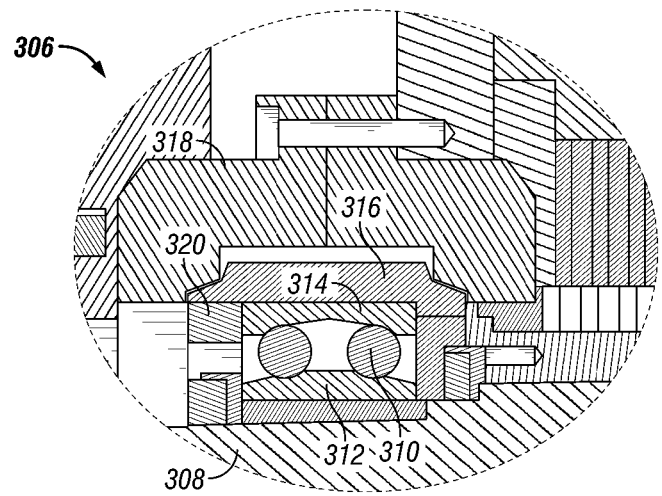
FIG. 5 illustrates an enlarged cross-sectional view of the encircled portion of the auxiliary bearing system illustrated in FIG. 3, according to one or more exemplary embodiments disclosed.

FIG. 4 illustrates a cross-sectional perspective view of a portion of the auxiliary bearing system 306 illustrated in FIG. 3, according to one or more exemplary embodiments disclosed. FIG. 5 illustrates an enlarged cross-sectional view of the encircled portion 5 of the auxiliary bearing system 306 illustrated in FIG. 3, according to one or more exemplary embodiments disclosed. The auxiliary bearing system 306 may include a rolling element bearing 310 that may include a pair of ball bearings. The auxiliary bearing system 306 may also include an inner bearing ring 312 through which the shaft 308 extends, and an outer bearing ring 314. The inner bearing ring 312 may be coupled to the shaft 308. An inertia ring 316 may be coupled to the outer bearing ring 314. FIG. 4 also illustrates an auxiliary bearing receiver housing 318 encasing the rolling element bearing 310 and/or inertia ring 316 in the axial direction and the radial direction. A radial clearance and an axial clearance may be maintained between the auxiliary bearing receiver housing 318 and the inertia ring 316 when the shaft 308 is supported by the primary bearing system. According to example embodiments, both the rolling element bearing 310 and the inertia ring 316 rotate at shaft speed when the shaft 308 is supported by the primary bearing system. The auxiliary bearing receiver housing 318 may be stationary. The inertia ring 316 may be retained in its position in the auxiliary bearing receiver housing 318 by an inertia ring retaining nut 320.

When the primary bearing system fails, the shaft 308 may drop and/or shift location relative to the stationary reference frame in response to various forces, for example, gravity and aerodynamic force, acting on the shaft 308. When the shaft 308 drops, an outer surface of the inertia ring 316 and an inner surface of the auxiliary bearing receiver housing 318 may contact each other. This may cause the inertia ring 316 to decelerate from a rotational speed of the shaft 308 due to frictional contact with the inner surface of the auxiliary bearing receiver housing 318.

Figure 6:
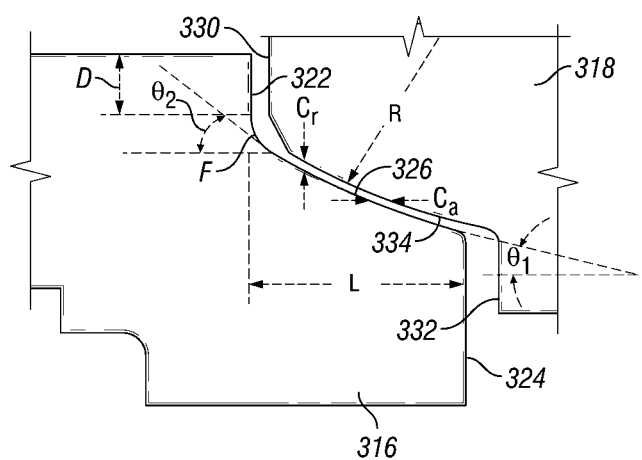
FIG. 6 illustrates a geometry of an outer surface of an inertia ring and a geometry of an inner surface of an auxiliary bearing receiver housing, according to one or more exemplary embodiments disclosed.

FIG. 6 illustrates a geometry of the outer surface of the inertia ring 316 and a geometry of the inner surface of the auxiliary bearing receiver housing 318, according to one or more exemplary embodiments disclosed. As is seen, the outer surface of the inertia ring 316 has a generally arcuate cross-sectional profile at two opposite ends of the inertia ring 316 (See FIG. 5, for example). Illustrated in FIG. 6 and discussed below is the geometry of the arcuate surface on the right side of the inertia ring 316. It will be appreciated that this discussion may also be applied to the geometry of the arcuate surface on the left side of the inertia ring 316.

According to example embodiments, the inertia ring 316 may have a radially extending surface 322 parallel to an axial outer surface 324. The radially extending surface 322 and the axial outer surface 324 may be generally perpendicular to the rotational axis of the shaft 308. An arcuate surface 326 may extend between the radially extending surface 322 and the axial outer surface 324. The geometry of the arcuate surface 326 may be such that a tangent at a point on the arcuate surface 326 at or adjacent a radial inner end of the arcuate surface 326 may make an angle ($\theta_1$) of about 10 to 15 degrees with the axis of rotation of the shaft 308. An axial extent (L) of the arcuate surface 326 may be about 0.5 inches (1.27 cm).

A fillet radius (F) of about 0.030 inches (0.0762 cm) may be defined at or adjacent a radial outer end of the arcuate surface 326 adjacent the radially extending surface 322. A tangent at a point on the arcuate surface 326 at or adjacent the radial outer end of the arcuate surface 326 may make an angle ($\theta_2$) of about 30 to 45 degrees with the axis of rotation of the shaft 308. In an example embodiment, a radius of curvature (R) of the arcuate surface 326 may be about 2 inches (5.08 cm). As seen in FIG. 6, the radially extending surface 322 may be disposed at the radial outer end of the arcuate surface 326 of the inertia ring 316 and the radially extending surface 322 may be about 0.15 inches (0.381 cm) in length (D). During normal operation, an axial clearance ($C_a$) of about 0.050 inches (0.127 cm) and a radial clearance ($C_r$) of about 0.020 inches (0.0508 cm) may be present between the inertia ring 316 and the auxiliary bearing receiver housing 318.

As is seen in FIG. 6, the topography of the inner surface of the auxiliary bearing receiver housing 318 may generally follow the topography of the outer surface of the inertia ring 316. Stated otherwise, the topography of the outer surface of the inertia ring 316 and the topography of the inner surface of the auxiliary bearing receiver housing 318 are such that the inertia ring 316 may seat the auxiliary bearing receiver housing 318 when the inertia ring 316 and the auxiliary bearing receiver housing 318 contact each other. The auxiliary bearing receiver housing 318 may have a radially extending surface 330 parallel to an axial inner surface 332, and an arcuate surface 334 extending therebetween. The radially extending surface 330 and the axial inner surface 332 may be generally perpendicular to the rotational axis of the shaft 308. The arcuate surface 334 of the auxiliary bearing receiver housing 318 may be relatively more skewed than the arcuate surface 326 of the inertia ring 316.

Figure 7:
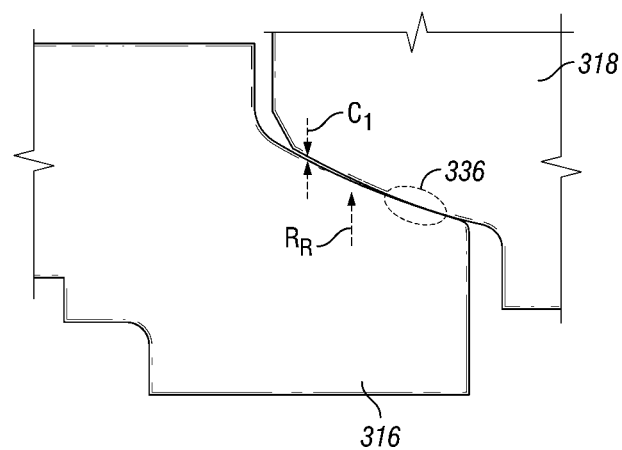
FIG. 7 illustrates an interface between the inertia ring and the auxiliary bearing receiver housing of FIG. 6 during an excursion of the shaft in a generally radial direction, according to one or more exemplary embodiments disclosed.

FIG. 7 illustrates an interface between the inertia ring 316 and the auxiliary bearing receiver housing 318 during an excursion of the shaft 308 in a generally radial direction $R_R$ due to failure of the primary bearing system, according to one or more exemplary embodiments disclosed. When the primary bearing system fails, the inertia ring 316 may move in a generally radial direction $R_R$ and the inertia ring 316 may contact the auxiliary bearing receiver housing 318 at a first contact zone 336. A clearance ($C_1$) of about 0.005 to 0.010 inches (0.0127 to 0.0254 cm) may be observed between the inertia ring 316 and the auxiliary bearing receiver housing 318 at or adjacent the radial outer end of the arcuate surface 326.

Figure 8:
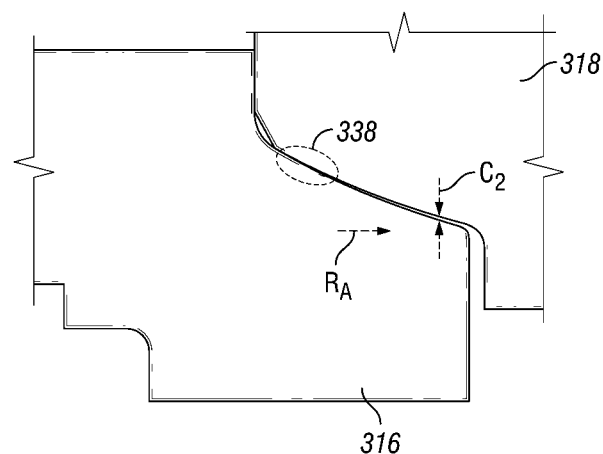
FIG. 8 illustrates the interface between the inertia ring and the auxiliary bearing receiver housing of FIG. 6 during an excursion of the shaft in a generally axial direction, according to one or more exemplary embodiments disclosed.

FIG. 8 illustrates the interface between the inertia ring 316 and the auxiliary bearing receiver housing 318 during an excursion of the shaft 308 in a generally axial direction $R_A$, according to one or more exemplary embodiments disclosed. Generally, during operation of the rotating machine, some amount of axial thrust force may be experienced by the shaft 308. Due to the axial thrust force, when the primary bearing system fails, the inertia ring 316 may be driven in the generally axial direction ($R_A$) and may contact the auxiliary bearing receiver housing 318 at a second contact zone 338 after contacting the auxiliary bearing receiver housing 318 in the generally radial direction $R_R$ illustrated in FIG. 7. A clearance ($C_2$) may be present between the inertia ring 316 and the auxiliary bearing receiver housing 318 at or adjacent the radial inner end of the arcuate surface 326. When the inertia ring 316 contacts the auxiliary bearing receiver housing 318 at the second contact zone 338, the shaft 308 may be centered in the auxiliary bearing receiver housing 318 and the rotational axis of the auxiliary bearing system 306 may be co-axial with the rotation axis of the shaft 308. Due to the axial thrust force, either the right side or the left side of the inertia ring 316 may contact the auxiliary bearing receiver housing 318.

The geometry of the first contact zone 336 and the second contact zone 338 may exert a centering force on the shaft 308. For example, the relatively shallow angle, $\theta_1$, at or adjacent the first contact zone 336 may maximize the centering force by directing a substantial portion of any axial force on the shaft 308 in the generally radial direction $R_R$. The relatively open angle, $\theta_2$, and the geometry of the second contact zone 338 may ensure two operational aspects. Firstly, the relatively open angle, $\theta_2$, and the geometry of the second contact zone 338 may provide an adequate axial force bearing surface area for transmittal of the axial thrust force. Secondly, any tendency for the arcuate surfaces 326, 334 to lock-up and wedge together may be minimized. A minimum and/or maximum value of the angles $\theta_1$ and/or $\theta_2$ may be dependent on the geometry of the radially extending surface 322, the axial outer surface 324, the arcuate surface 326, and/or the arcuate surface 334. Although the actual self-locking angle value may depend on a specific tribology of the arcuate surfaces 326, 334, as a general rule of design for arcuate surfaces 326, 334 comprising steel, the self-locking angle may be about 10 to 15 degrees.

The contact zone geometry may advantageously provide a first contact zone 336 (place of initial drop) having a relatively smaller angle, while providing a relatively smooth transition to the post-failure rotating position of the shaft 308 (second contact zone 338). At the post-failure rotating position, the shaft 308 may be centered in the auxiliary bearing receiver housing 318.

Another benefit of the geometry of the arcuate surfaces 326, 334 is that fretting and/or galling of the arcuate surfaces 326, 334 when the arcuate surfaces 326, 334 are in contact is minimized. The fretting and/or galling of the arcuate surfaces 326, 334 may be minimized because the first contact zone 336 may have a relatively shallow angle that may provide a relatively radial contact between the inertia ring 316 and the auxiliary bearing receiver housing 318 and may permit a generally uniform rotational velocity along the first contact zone 336.

Figure 9:
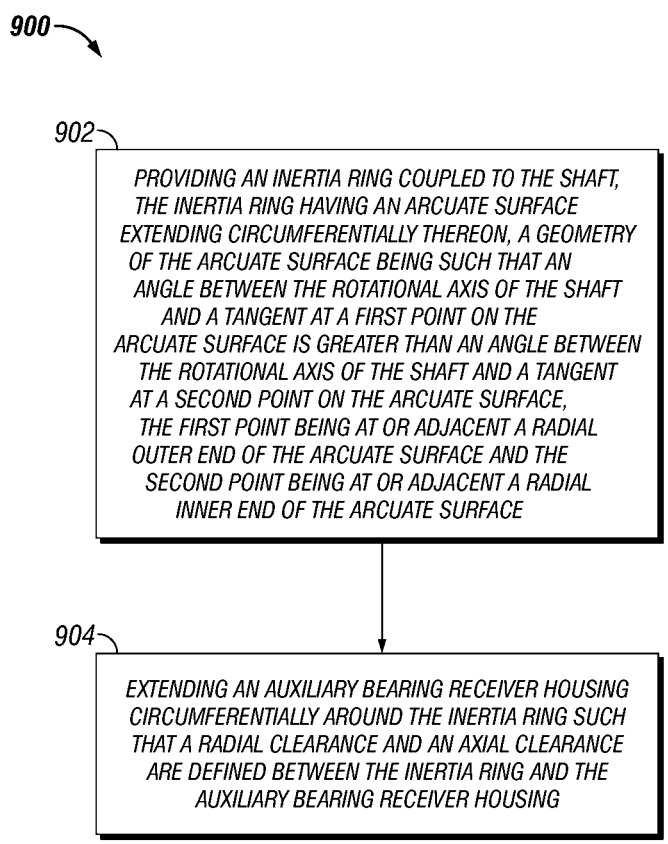
FIG. 9 is a flowchart of a method for supporting a shaft, according to one or more exemplary embodiments disclosed.

FIG. 9 is a flowchart of a method 900 for supporting a shaft, according to one or more exemplary embodiments disclosed. The method 900 may include providing an inertia ring coupled to the shaft, as shown at 902. The inertia ring may have an arcuate surface extending circumferentially thereon. A geometry of the arcuate surface may be such that an angle between the rotational axis of the shaft and a tangent at a first point on the arcuate surface may be greater than an angle between the rotational axis of the shaft and a tangent at a second point on the arcuate surface. The first point may be at or adjacent a radial outer end of the arcuate surface and the second point may be at or adjacent a radial inner end of the arcuate surface. The method 900 may further include extending an auxiliary bearing receiver housing circumferentially around the inertia ring such that a radial clearance and an axial clearance are defined between the inertia ring and the auxiliary bearing receiver housing, as shown at 904.

According to example embodiments, the geometry of the arcuate surfaces 326, 334 may be applied to other auxiliary bearing system configurations as well. For instance, in a system with statically mounted auxiliary bearings, the interfacing contact surfaces that are located at the inner radial extent of the auxiliary bearings may be profiled in this advantageous way. Also, the geometry of the arcuate surfaces 326, 334 may be implemented in a rotating machine with a vertically oriented rotor system. As compared to prior art auxiliary bearing systems, the exemplary geometry of the arcuate surfaces 326, 334 may provide relatively higher centering forces and may minimize self-locking of the surfaces of the inertia ring 316 and the auxiliary bearing receiver housing 318.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

I claim:

1. An auxiliary bearing system to support a rotating shaft, comprising:
    an auxiliary bearing receiver housing including a first arcuate surface extending between a first radially extending surface of the auxiliary bearing receiver housing and an axial inner surface of the auxiliary bearing receiver housing; and
    an inertia ring coupled to the rotating shaft, the inertia ring comprising:
        an axial outer surface;
        a second radially extending surface parallel to the axial outer surface;
        a second arcuate surface extending between the axial outer surface and the second radially extending surface, the second arcuate surface having a radial outer end at or adjacent the second radially extending surface and a radial inner end at or adjacent the axial outer surface;
        a first angle defined between the axis of rotation of the rotating shaft and a first tangent at a first point on the second arcuate surface at or adjacent the radial outer end; and
        a second angle defined between the axis of rotation of the rotating shaft and a second tangent at a second point on the second arcuate surface at or adjacent the radial inner end, wherein
            the first angle is greater than the second angle, and
            the second arcuate surface is configured such that the auxiliary bearing receiver housing seats the inertia ring when the inertia ring contacts the auxiliary bearing receiver housing.

2. The auxiliary bearing system of claim 1, wherein the auxiliary bearing receiver housing circumscribes the inertia ring, and a clearance is defined between the first arcuate surface and the second arcuate surface when the rotating shaft is supported by a primary bearing system.

3. The auxiliary bearing system of claim 2, wherein the clearance is about 0.127 cm in an axial direction and the clearance is about 0.0508 cm in a radial direction.

4. The auxiliary bearing system of claim 1, wherein a fillet radius of about 0.0762 cm is defined at or adjacent the radial outer end of the second arcuate surface.

5. The auxiliary bearing system of claim 1, wherein a length of the second radially extending surface is about 0.381 cm.

6. The auxiliary bearing system of claim 1, wherein an axial extent of the second arcuate surface is about 1.27 cm.

7. The auxiliary bearing system of claim 1, wherein a radius of curvature of the second arcuate surface is about 5.08 cm.

8. The auxiliary bearing system of claim 1, wherein the first arcuate surface and the second arcuate surface are configured such that a centering force is exerted on the rotating shaft when the rotating shaft is supported by the auxiliary bearing system.

9. The auxiliary bearing system of claim 1, wherein the auxiliary bearing system further comprises a rolling element bearing including an inner ring coupled to the rotating shaft and an outer ring coupled to the inertia ring.

10. The auxiliary bearing system of claim 1, wherein the auxiliary bearing system further comprises an inertia ring retaining nut configured to retain the inertia ring in the auxiliary bearing receiver housing.

11. The auxiliary bearing system of claim 1, wherein the first arcuate surface and the second arcuate surface are configured such that, when a primary bearing system supporting the rotating shaft fails, the inertia ring contacts the auxiliary bearing receiver housing at a first contact zone, the first contact zone being at or adjacent the radial inner end of the second arcuate surface.

12. The auxiliary bearing system of claim 11, wherein the first arcuate surface and the second arcuate surface are configured such that, subsequent to contacting the auxiliary bearing receiver housing, the inertia ring contacts the auxiliary bearing receiver housing at a second contact zone, the second contact zone being at or adjacent the radial outer end of the second arcuate surface.

13. The auxiliary bearing system of claim 12, wherein, the first arcuate surface and the second arcuate surface are configured such that a radial clearance is defined between the first arcuate surface and the second arcuate surface at or adjacent the radial inner end of the second arcuate surface, when the inertia ring contacts the auxiliary bearing receiver housing at the second contact zone.

14. The auxiliary bearing system of claim 12, wherein, the first arcuate surface and the second arcuate surface are configured such that the rotational axis of the rotating shaft is co-axial with the rotational axis of an auxiliary bearing of the auxiliary bearing system, when the inertia ring contacts the auxiliary bearing receiver housing at the second contact zone.

15. The auxiliary bearing system of claim 11, wherein the first arcuate surface and the second arcuate surface are configured such that a radial clearance between the inertia ring and the auxiliary bearing receiver housing at or adjacent the radial outer end of the second arcuate surface is about 0.0127 cm to 0.0254 cm, when the inertia ring contacts the auxiliary bearing receiver housing at the first contact zone.

16. A rotor system, comprising:
a shaft;
a primary bearing system that supports the shaft during normal operating conditions; and
an auxiliary bearing system that supports the shaft when the primary bearing system fails, the auxiliary bearing system comprising:
an auxiliary bearing receiver housing including a first arcuate surface extending between a first radially extending surface of the auxiliary bearing receiver housing and an axial inner surface of the auxiliary bearing receiver housing; and
an inertia ring coupled to the shaft, the inertia ring contacting the auxiliary bearing receiver housing when the primary bearing system fails, the inertia ring comprising:
an axial outer surface;
a second radially extending surface parallel to the axial outer surface; and
a second arcuate surface extending between the axial outer surface and the second radially extending surface,
wherein the second arcuate surface is configured such that an angle between the rotational axis of the shaft and a tangent at a first point on the second arcuate surface at or adjacent the second radially extending surface is greater than an angle between the rotational axis of the shaft and a tangent at a second point on the second arcuate surface at or adjacent the axial outer surface.

17. The rotor system of claim 16, wherein an axial extent of the second arcuate surface is about 1.27 cm.

18. The rotor system of claim 16, wherein a fillet radius of about 0.0762 cm is defined at or adjacent a radial outer end of the second arcuate surface.

19. The rotor system of claim 16, wherein a radius of curvature of the second arcuate surface is about 5.08 cm.

20. The rotor system of claim 16, wherein the first arcuate surface and second arcuate surface are configured such that, when the primary bearing system fails, the second arcuate surface contacts the first arcuate surface adjacent the axial inner surface prior to contacting the first arcuate surface adjacent the first radially extending surface.

21. The rotor system of claim 20, wherein the first arcuate surface and the second arcuate surface are configured such that, when the first arcuate surface contacts the second arcuate surface, a centering force is exerted on the shaft.

22. A method comprising:
providing an inertia ring coupled to a shaft, the inertia ring having an arcuate surface extending circumferentially thereon, a geometry of the arcuate surface being such that an angle between the rotational axis of the shaft and a tangent at a first point on the arcuate surface is greater than an angle between the rotational axis of the shaft and a tangent at a second point on the arcuate surface, the first point being at or adjacent a radial outer end of the arcuate surface and the second point being at or adjacent a radial inner end of the arcuate surface; and
extending an auxiliary bearing receiver housing circumferentially around the inertia ring such that a radial clearance and an axial clearance are defined between the inertia ring and the auxiliary bearing receiver housing.

23. The method of claim 22, wherein a fillet radius of about 0.0762 cm is defined at or adjacent the radial outer end of the arcuate surface.

24. The method of claim 22, wherein the inertia ring contacts the auxiliary bearing receiver housing at or adjacent the second point prior to contacting the auxiliary bearing receiver housing at or adjacent the first point, when a primary bearing system supporting the shaft fails.

* * * * *